(12) United States Patent
Obayashi

(10) Patent No.: US 11,099,935 B2
(45) Date of Patent: Aug. 24, 2021

(54) ERROR HANDLING ASSOCIATED WITH BOOT PROGRAM ALTERATION

(71) Applicant: CANON KABUSHIKI KAISHA, Tokyo (JP)

(72) Inventor: Yosuke Obayashi, Nagareyama (JP)

(73) Assignee: Canon Kabushiki Kaisha, Tokyo (JP)

( * ) Notice: Subject to any disclaimer, the term of this patent is extended or adjusted under 35 U.S.C. 154(b) by 90 days.

(21) Appl. No.: 16/569,856

(22) Filed: Sep. 13, 2019

(65) Prior Publication Data
US 2020/0104211 A1  Apr. 2, 2020

(30) Foreign Application Priority Data

Sep. 28, 2018 (JP) .............................. JP2018-184987

(51) Int. Cl.
*G06F 11/14* (2006.01)
*G06F 21/57* (2013.01)

(52) U.S. Cl.
CPC ........ *G06F 11/1417* (2013.01); *G06F 21/575* (2013.01)

(58) Field of Classification Search
CPC .............. G06F 11/0784; G06F 11/079; G06F 11/0793; G06F 11/1417; G06F 21/575
See application file for complete search history.

(56) References Cited

U.S. PATENT DOCUMENTS

| | | | | |
|---|---|---|---|---|
| 7,117,396 B2* | 10/2006 | Komarla | ............... | G06F 11/073 714/45 |
| 7,558,958 B2* | 7/2009 | Lieberman | ......... | H04N 21/6543 713/176 |
| 7,634,648 B2* | 12/2009 | Koyama | ................... | G06F 8/60 713/2 |
| 8,006,125 B1* | 8/2011 | Meng | ................... | G06F 11/1417 714/6.2 |
| 8,103,909 B2* | 1/2012 | Hanna | ................... | G06F 21/575 714/15 |
| 9,407,784 B2 | 8/2016 | Obayashi | | |
| 2018/0101388 A1* | 4/2018 | Hummel | .................... | G06F 8/65 |

FOREIGN PATENT DOCUMENTS

JP  2015-138269 A  7/2015

* cited by examiner

*Primary Examiner* — Joseph R Kudirka
(74) *Attorney, Agent, or Firm* — Venable LLP

(57) ABSTRACT

The present invention provides an information processing apparatus having a user interface, a non-volatile memory that stores a loading program, and another non-volatile memory that stores a boot program and a notifying program for notifying an error. The information processing apparatus executes the loading program at startup to verify the boot program and activates the notifying program based on a detection of an alteration of the boot program to notify an error via the user interface.

8 Claims, 7 Drawing Sheets

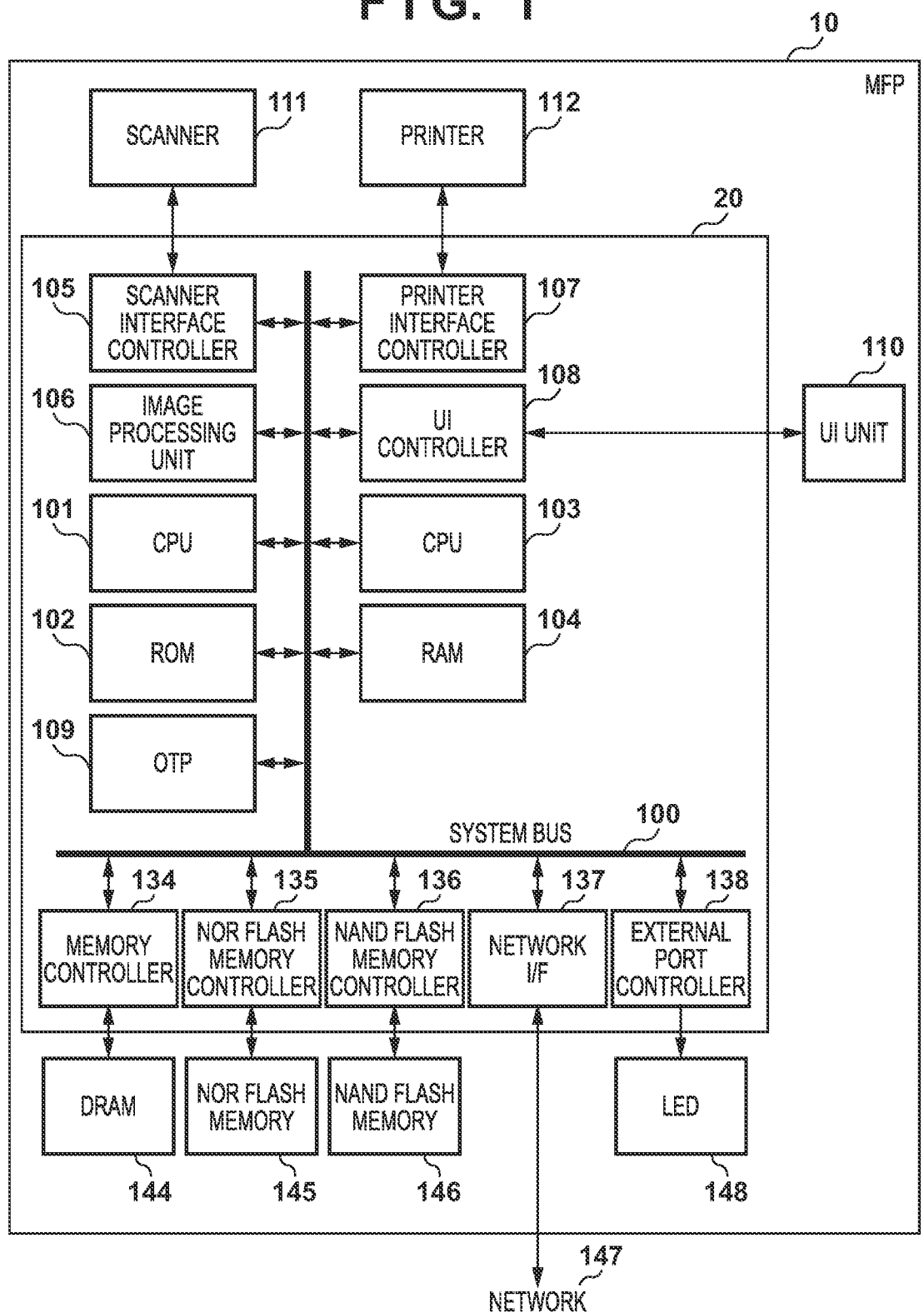
F I G. 1

ERROR HANDLING ASSOCIATED WITH BOOT PROGRAM ALTERATION

BACKGROUND OF THE INVENTION

Field of the Invention

The present invention relates to an information processing apparatus, and a method of controlling the information processing apparatus.

Description of the Related Art

Software attacks that take advantage of vulnerability in software, falsify software, and maliciously exploit computers have been problematic. As a countermeasure against such attacks, Japanese Patent Laid-Open No. 2015-138269 discloses a method of detecting an alteration by recalculating and verifying a hash value of a boot program for each activation. Then, when an alteration of the boot program is detected at startup, a method is proposed for performing automatic recovery by a boot program with a redundant configuration.

When activation is not possible even using the technology of Japanese Patent Laid-Open No. 2015-138269, it is desirable to notify a user of the situation by some means. In order to provide a rich notification method (for example, displaying a message on a UI screen) in which the user can easily understand the situation upon startup error, it is necessary to incorporate a process equivalent to the boot program such as system initialization into an alteration detection program. Therefore, the memory capacity of the ROM holding the alteration detection program increases, and when stored in the ROM, there is a problem that the notification content cannot be changed, or the like.

For this reason, conventionally, notification at the time of startup error is limited to, for example, lighting of an LED by GPIO (General Purpose Input/Output) control, ringing of a buzzer, or the like, and there is a problem that the user has difficulty understanding the error condition.

SUMMARY OF THE INVENTION

An aspect of the present invention is to eliminate the above-mentioned problem with conventional technology.

The feature of the present invention is to provide a technique for notifying the user of an error in an easy-to-understand manner, which detects, at startup, the presence or absence of an alteration of a boot program by a loading program and, when the alteration of the boot program is detected, activates a notifying program for notifying an error.

According to a first aspect of the present invention, there is provided an information processing apparatus comprising: a user interface; a non-volatile memory that stores a loading program; another non-volatile memory that stores a boot program and a notifying program for notifying an error; and a controller that executes the loading program at startup to verify the boot program and activates the notifying program based on a detection of an alteration of the boot program to notify an error via the user interface.

According to a second aspect of the present invention, there is provided an information processing apparatus comprising: a user interface; a non-volatile memory that stores a loading program; a boot program; and another non-volatile memory that stores a copied boot program; a storing unit that stores an occurrence of an error in a case where the loading program is executed to verify the boot program at startup and an alteration of the boot program is detected; and a controller that verifies a copied boot program in a case where the alteration of the boot program is detected, and notifies an error via the user interface if the occurrence of the error is stored in the storing unit in a case where an alteration of the copied boot program is not detected.

According to a third aspect of the present invention, there is provided a method of controlling an information processing apparatus including a non-volatile memory storing a loading program and a non-volatile memory storing a boot program and a notifying program for notifying an error, the method comprising: executing the loading program to verify the boot program at startup; activating the notifying program to notify an error in a case where an alteration of the boot program is detected; verifying a main program in a case that the alteration of the boot program is not detected; and executing the main program in a case that the alteration of the main program is not detected.

According to a fourth aspect of the present invention, there is provided a method of controlling an information processing apparatus including a non-volatile memory storing a loading program, a boot program, and a non-volatile memory storing a copied boot program, the method comprising: executing the loading program to verify the boot program at startup; storing an occurrence of an error in a case where an alteration of the boot program is detected; verifying a copied boot program in a case where the alteration of the boot program is detected; notifying the error in a case where the occurrence of the error is stored in the storing in a case that the alteration of the copied boot program is not detected; verifying a main program in a case that the alteration of the boot program is not detected; and executing the main program in a case that an alteration of the main program is not detected.

Further features of the present invention will become apparent from the following description of exemplary embodiments with reference to the attached drawings.

BRIEF DESCRIPTION OF THE DRAWINGS

The accompanying drawings, which are incorporated in and constitute a part of the specification, illustrate embodiments of the invention and, together with the description, serve to explain the principles of the invention.

FIG. 1 is a block diagram for describing a configuration of a multi-function peripheral according to a first exemplary embodiment.

DESCRIPTION OF THE EMBODIMENTS

Figure 2:
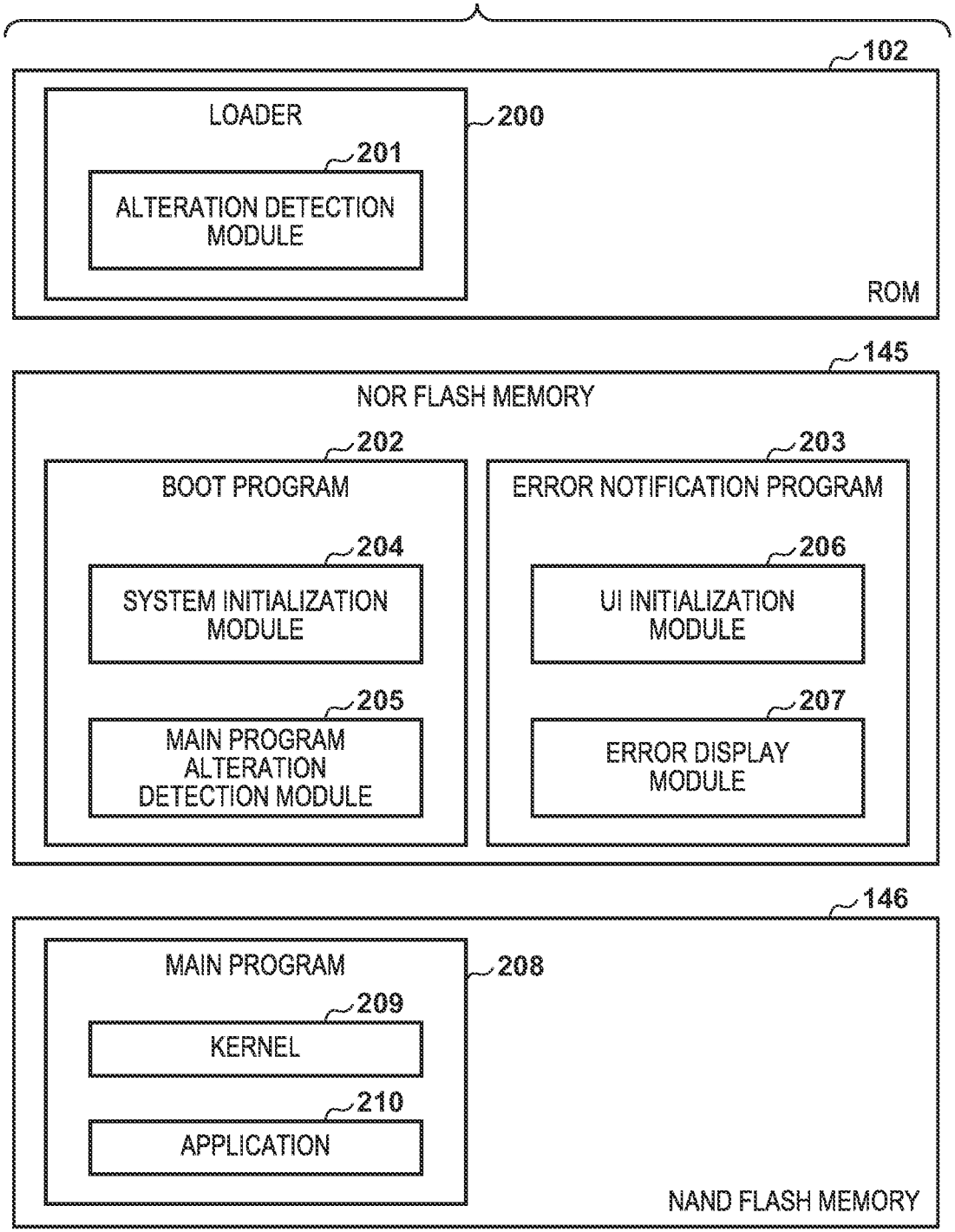
FIG. 2 depicts a view for describing software modules installed in the multi-function peripheral according to the first exemplary embodiment.

Embodiments of the present invention will be described hereinafter in detail, with reference to the accompanying drawings. It is to be understood that the following embodiments are not intended to limit the claims of the present invention, and that not all of the combinations of the aspects that are described according to the following embodiments are necessarily required with respect to the means to solve the problems according to the present invention. A digital MFP (Multi Function Peripheral) will be described as an example of the information processing apparatus according to the embodiment. However, the application range is not limited to the MFP, and can be also applied to an information processing apparatus including, for example, a PC, a communication apparatus, or the like.

First Exemplary Embodiment

FIG. 1 is a block diagram for describing a configuration of an MFP 10 according to a first exemplary embodiment.

A controller (control unit) 20 includes modules configured to control the MFP 10, and will be described as being configured as a semiconductor chip in the first exemplary embodiment. A ROM 102 is a read only memory (non-rewritable non-volatile memory) configured of a mask ROM, and stores a loader (loading program) 200 (FIG. 2) or the like that are executed by the CPU 103. A NOR flash memory 145 stores a boot program 202 (FIG. 2), an error notification program 203 (FIG. 2) or the like, executed by a CPU 103. A NAND flash memory 146 stores a main program 208 (FIG. 2) executed by a CPU 101. Each of the flash memories is a rewritable non-volatile memory, and can be accessed from the CPU 101 and CPU 103 via a NOR flash memory controller 135 or a NAND flash memory controller 136. The CPU 103 performs the signature verification of each program stored in the NOR flash memory 145 and the NAND flash memory 146, initialization of each control unit, and resetting release of the CPU 101. In addition, the CPU 101 controls the entire MFP 10. An OTP 109 is a ROM (One Time Programmable ROM) that can be written only once at the time of manufacture, and holds a public key for signature verification. A RAM 104 is a random access memory configured of, for example, an SRAM, and is used to store programs and temporary data, or the like. A scanner interface controller 105 controls reading of a document by a scanner 111. A printer interface controller 107 controls print processing or the like by a printer 112. An image processing unit 106 performs shading processing on image data of a document input from the scanner 111 and halftone processing for output to the printer 112. A UI controller 108 controls an interface between a UI (user interface) unit 110 and the controller 20.

The DRAM 144 is used as a work memory of the program or the image processing unit 106, executed by the CPU 101. A memory controller 134 performs various command control for accessing the DRAM 144. The UI unit 110 is a user interface of a touch panel (not illustrated), and receives an operation from the user and performs display on the screen. The UI controller 108 generates display timing on the touch panel of the UI unit 110 and receives an input command from the touch panel. A network I/F 137 receives a print command from a personal computer (PC) (not illustrated) via the network 147, transmits scan data to the network 147, or the like. An external port controller 138 is a general-purpose input/output port and, for example, can turn on the LED (display device) 148 as needed by controlling an output port to inform software or hardware abnormality to the outside. A system bus 100 mutually connects the connected modules. Various data and control commands or the like are transmitted and received between the CPU 101 and the CPU 103 and each module via the system bus 100.

FIG. 2 depicts a view for describing software modules installed in the MFP 10 according to the first exemplary embodiment.

A loader 200 is a program executed by the CPU 103 when the power of the MFP 10 is turned on, and is stored in the ROM 102. The loader 200 includes an alteration detection module 201 and starts executing the boot program 202 after successful signature verification of the boot program 202. When the signature verification of the boot program 202 fails, a signature verification of an error notification program 203 is performed and the execution of the error notification program 203 starts. Details of this process will be described later.

The boot program 202 is a program executed by the CPU 103 after signature verification of the boot program 202 by the loader 200, and is stored in the NOR flash memory 145. A system initialization module 204 performs various initializations of the memory controller 134 or the like. A main program alteration detection module 205 performs the signature verification of the main program 208. When the signature verification of the main program 208 succeeds, the main program 208 is deployed in the DRAM 144, and the reset of the CPU 101 is released. When the reset is released, the CPU 101 starts execution of the main program 208 deployed in the DRAM 144.

The main program 208 is a program executed by the CPU 101 and is stored in the NAND flash memory 146. A kernel 209 is a core program of the control system of the MFP 10, and performs control, scheduling, or the like of various resources provided to an application 210. The application 210 is a program for realizing various functions (copy, SEND, print, etc.) provided by the MFP 10. The application 210 includes control of the scanner interface controller 105, the printer interface controller 107, the image processing unit 106, and the generation of the screen to be displayed on the UI unit 110, and the overall state control of the MFP 10, or the like.

The error notification program 203 is a program executed by the CPU 103 and is stored in the NOR flash memory 145. When the loader 200 detects an alteration of the boot program 202, the error notification program 203 notifies the error through the UI unit 110 instead of the loader 200. A UI initialization module 206 initializes the UI controller 108 that is required to display an error notification on the UI unit 110 and the memory controller 134. Unlike the system initialization module 204 of the boot program 202, the UI initialization module 206 initializes only the modules required to notify the UI unit 110 of an error, and does not initialize modules not required for notification. An error display module 207 creates a message for notifying the user of an error state and causes the message to be displayed on the UI unit 110.

Figure 3:
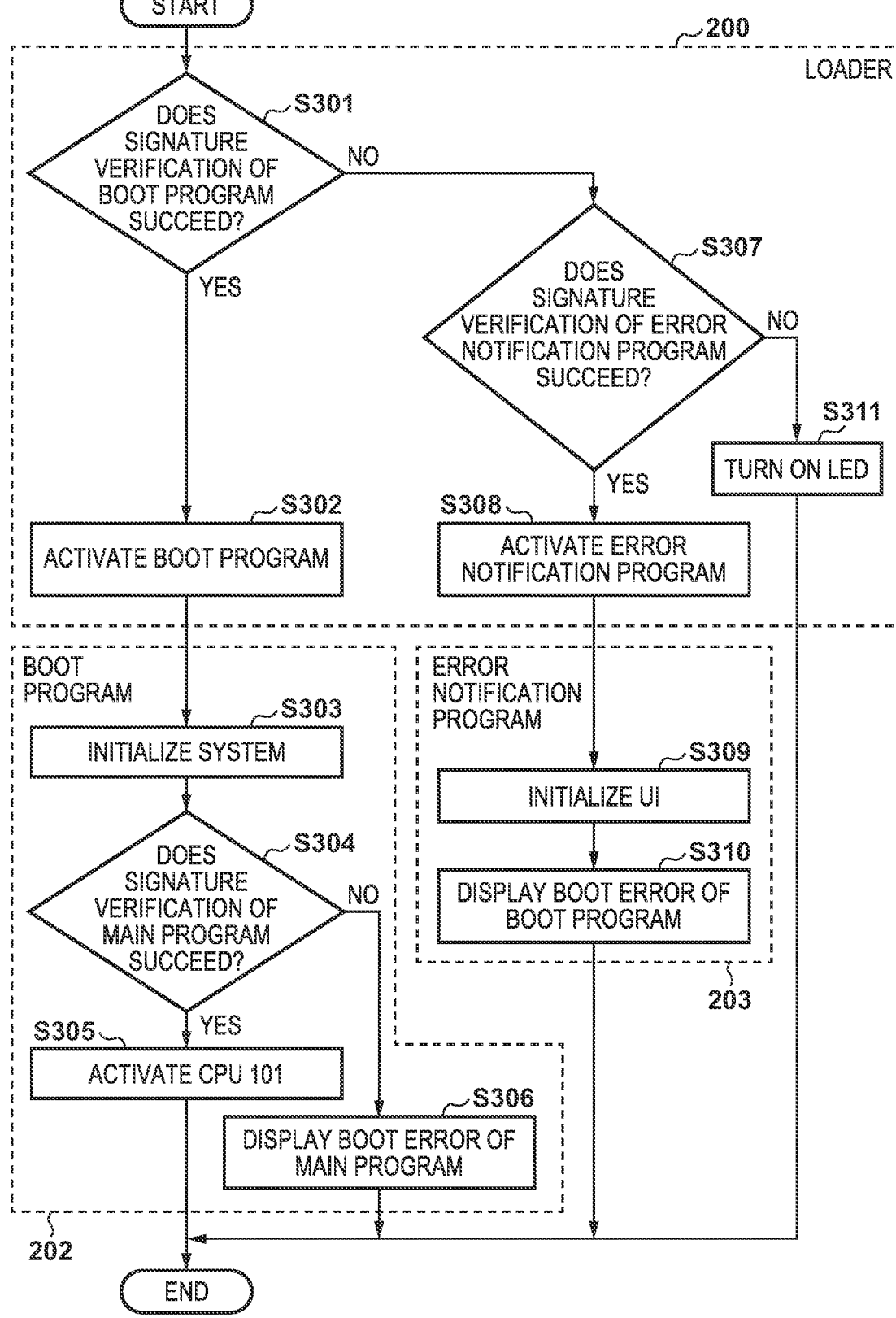
FIG. 3 is a flowchart for describing a process at startup by a CPU 103 of the multi-function peripheral according to the first exemplary embodiment.

FIG. 3 is a flowchart for describing a process at startup by the CPU 103 of the MFP 10 according to the first exemplary embodiment. In addition, the process described in the flowchart is realized by the CPU 103 deploying the program stored in the NOR flash memory 145 to the RAM 104 and executing the deployed program. Further, this process is started by turning on the power of the MFP 10 and releasing the reset of the controller 20. In addition, the broken lines illustrated in FIG. 3 indicate that each process is executed in either of the loader 200, the boot program 202, and the error notification program 203.

When the reset is released, the CPU 103 first executes the loader 200. When the loader 200 is started, the CPU 103 performs the signature verification of the boot program 202 stored in the NOR flash memory 145 in step S301. Here, in a case where the signature verification is successful, the process proceeds to step S302, and the CPU 103 activates the boot program 202. Thus, when the boot program 202 is activated, the process proceeds to step S303, and the CPU 103 controls the controller 20 to initialize the entire system. Then, the process proceeds to step S304, the CPU 103 performs the signature verification of the main program 208 that is stored in NAND flash memory 146 and that will be executed by CPU 101. In a case where the signature verification of the main program 208 is successful in step S304, the process advances to step S305, and the CPU 103 releases the reset of the CPU 101 after deploying the main program 208 to the DRAM 114. In this way, the CPU 101 is activated. Accordingly, the CPU 101 does not operate until the CPU 103 releases the reset of the CPU 101 in step S305. The above is a processing flow at startup when the signature verification of the programs succeed and the activation can be normally performed.

Next, processing when the signature verification of one of the programs fails and the program cannot be normally activated is explained.

In a case where the signature verification of the boot program 202 fails in step S301, the process advances to step S307, and the CPU 103 performs the signature verification of the error notification program 203. In a case where the signature verification of the error notification program 203 is successful, the process proceeds to step S308, and the CPU 103 activates the error notification program 203. Thus, when the error notification program 203 is activated, the CPU 103 initializes the UI unit 110 in step S309. Then, the process proceeds to step S310, the CPU 103 displays an error message indicating the boot error of the boot program on the UI unit 110, and ends the boot process. Furthermore, the reason why the signature verification of the error notification program 203 is performed in step S307 is to prevent the error notification program 203 from executing false processing when the error notification program 203 itself has been falsified.

On the other hand, when the signature verification of the error notification program 203 also fails in step S307, the process proceeds to step S311, and the CPU 103 turns on the LED 148 that is the remaining error notification means to notify the user of an error, and terminates this boot process. In this state, the user refers to the manual of the MFP 10 to recognize an abnormality of the device. On the other hand, when an error message is displayed on the UI unit 110 by the error notification program 203, the user can immediately recognize the abnormality of the device.

Furthermore, similar to when the signature verification of the main program 208 fails in step S304 of the boot program 202, the process proceeds to step S306, where the boot program 202 displays an error message on the UI unit 110 to notify the user of the boot error of the main program 208 and ends this process.

Figure 4:
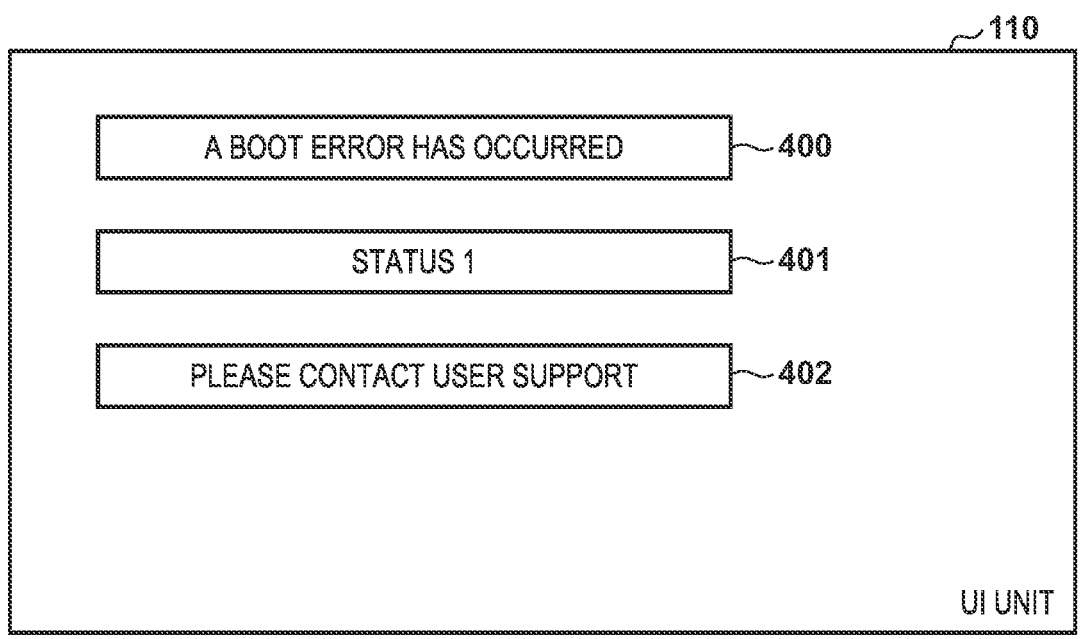
FIG. 4 depicts a view illustrating an example of an error message displayed on a UI unit according to the first exemplary embodiment.

FIG. 4 depicts a view illustrating an example of an error message displayed on the UI unit 110 according to the first exemplary embodiment.

An error message mainly has three elements. First, in an informative display 400, the current state of the device will be described in a language that can be understood even by the user. For example, it is "a boot error has occurred" or the like. This allows the user to easily recognize the current state of the device.

A status display 401 is a message for presenting the status of the device in more detail. This message is a display such as "status 1", for example, and the user cannot understand the meaning. However, it is possible to distinguish whether the boot program verification failed in step S301 or the main program verification failed in step S304 by reading this status at the time of a support inquiry or an inspection by a serviceperson later. Furthermore, it is possible to separate other unexpected errors.

A user action display 402 displays a message for presenting the action to be taken next by the user. For example, it is a display such as "Please contact user support". The messages illustrated in the first exemplary embodiment are merely examples, and the display order is not limited to this order. For example, the status display 401 may be omitted, or the display order of messages may be changed. Also, the display layout and the contents to be displayed are not limited to this embodiment.

As described above, according to the first exemplary embodiment, it is possible to provide an error notification that can be easily understood by the user even when the signature verification of the boot program fails, by separately preparing the error notification program. This is because the error notification processing is not provided in the loader (ROM), but is independently stored in the flash memories, so that the processing of the error notification such as the control of the UI unit and the screen generation or the like, which cannot be stored in the mask ROM inside the semiconductor chip, can be realized.

Furthermore, by performing also the signature verification of the error notification program in the same manner as the boot program, even in a case where the error notification program of the flash memory is falsified, it is possible to prevent the occurrence of a situation in which a false code is executed to cause a malfunction of the apparatus.

Second Exemplary Embodiment

A second exemplary embodiment will be described. In the first exemplary embodiment described above, the boot program 202 is not redundantly configured, and an example in which a boot error occurs once signature verification fails is described. However, as described in Japanese Patent Laid-Open No. 2015-138269, in order to improve tamper resistance and fault tolerance, it is conceivable to make the boot program redundant. Therefore, in the second exemplary embodiment, an error notification method when the signature verification of the program fails in a case where the boot program 202 has a redundant configuration will be described. Additionally, the configuration or the like of the MFP 10 according to the second exemplary embodiment is the same as that of the first exemplary embodiment described above, and thus the description thereof will be omitted.

Figure 5:
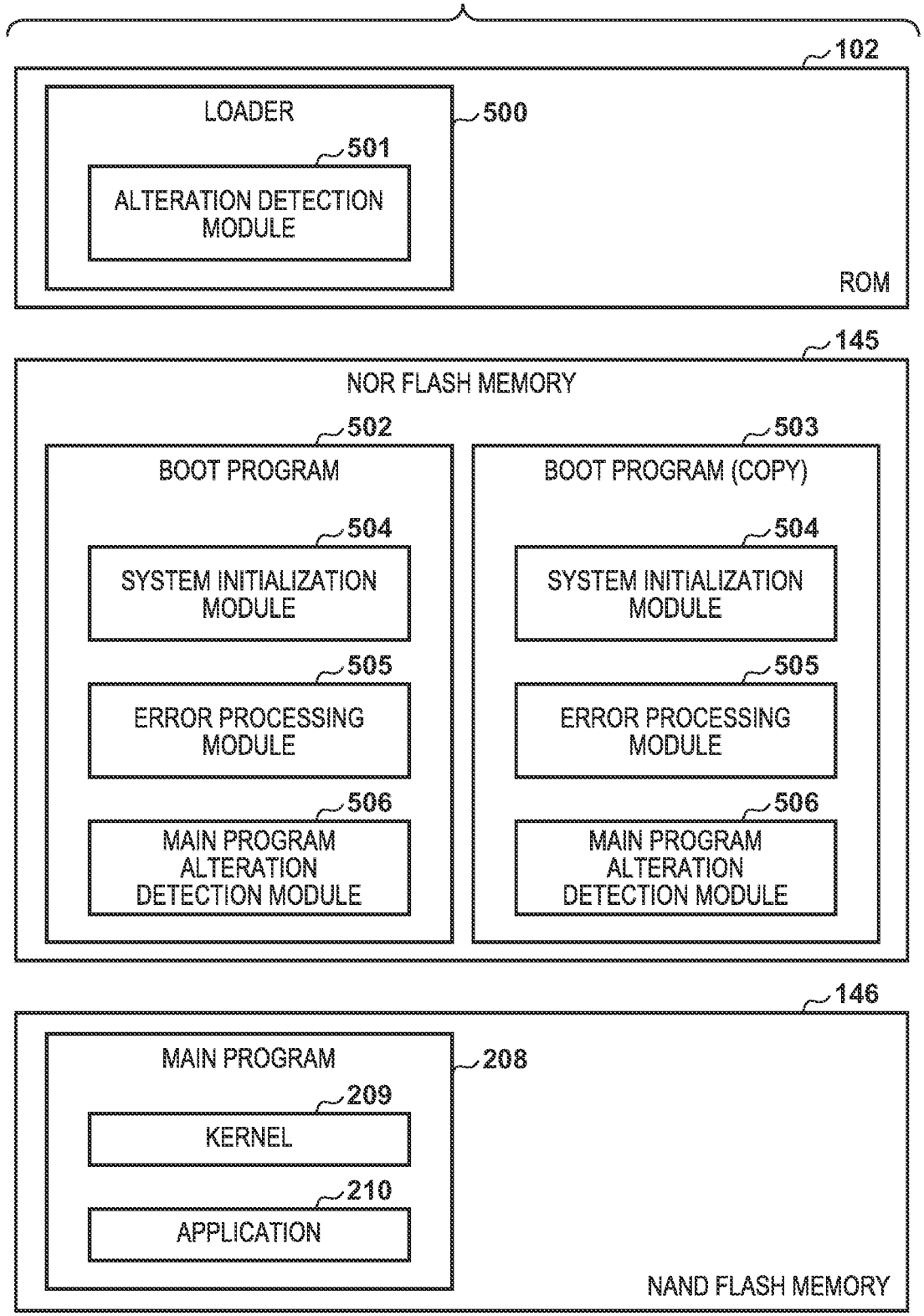
FIG. 5 depicts a view for describing software modules installed in the multi-function peripheral according to a second exemplary embodiment.

FIG. 5 depicts a view for describing software modules installed in the MFP 10 according to the second exemplary embodiment. A loader 500 is a program executed by the CPU 103 when the MFP 10 is powered on, and is stored in the ROM 102. The loader 500 includes an alteration detection module 501, and after the signature verification of a boot program 502 succeeds, the boot program 502 is activated. The NOR flash memory 145 according to the second exemplary embodiment includes the error notification program 203 described in the first exemplary embodiment, but the error notification program 203 is omitted in FIG. 5. In a case where the signature verification of the boot program 502 fails, the signature verification of the error notification program 203 is performed, which activates the error notification program 203. Details of this process will be described later.

Boot programs 502 and 503 are programs executed by the CPU 103 after signature verification by the loader 500, and are stored in the NOR flash memory 145. Furthermore, the boot program 503 is a copied boot program of the boot program 502, and the boot programs 502 and 503 are identical programs. A system initialization module 504 performs various initializations of the memory controller 134 or the like. A main program alteration detection module 506 performs the signature verification of the main program 208. In a case where the signature verification of the main program 208 is successful, the main program 208 is deployed to the DRAM 144 and then the reset of the CPU 101 is released. The CPU 101 starts execution of the main program 208 deployed to the DRAM 144 when the reset is released. When the loader 500 detects that an alteration of the boot program 502, an error processing module 505 reports an error through the UI unit 110 instead of the loader 500.

The main program 208 is a program executed by the CPU 101 after signature verification by the boot programs 502 and 503, and is stored in the NAND flash memory 146. The configuration of the main program 208 is the same as that of the first exemplary embodiment.

Figure 6:
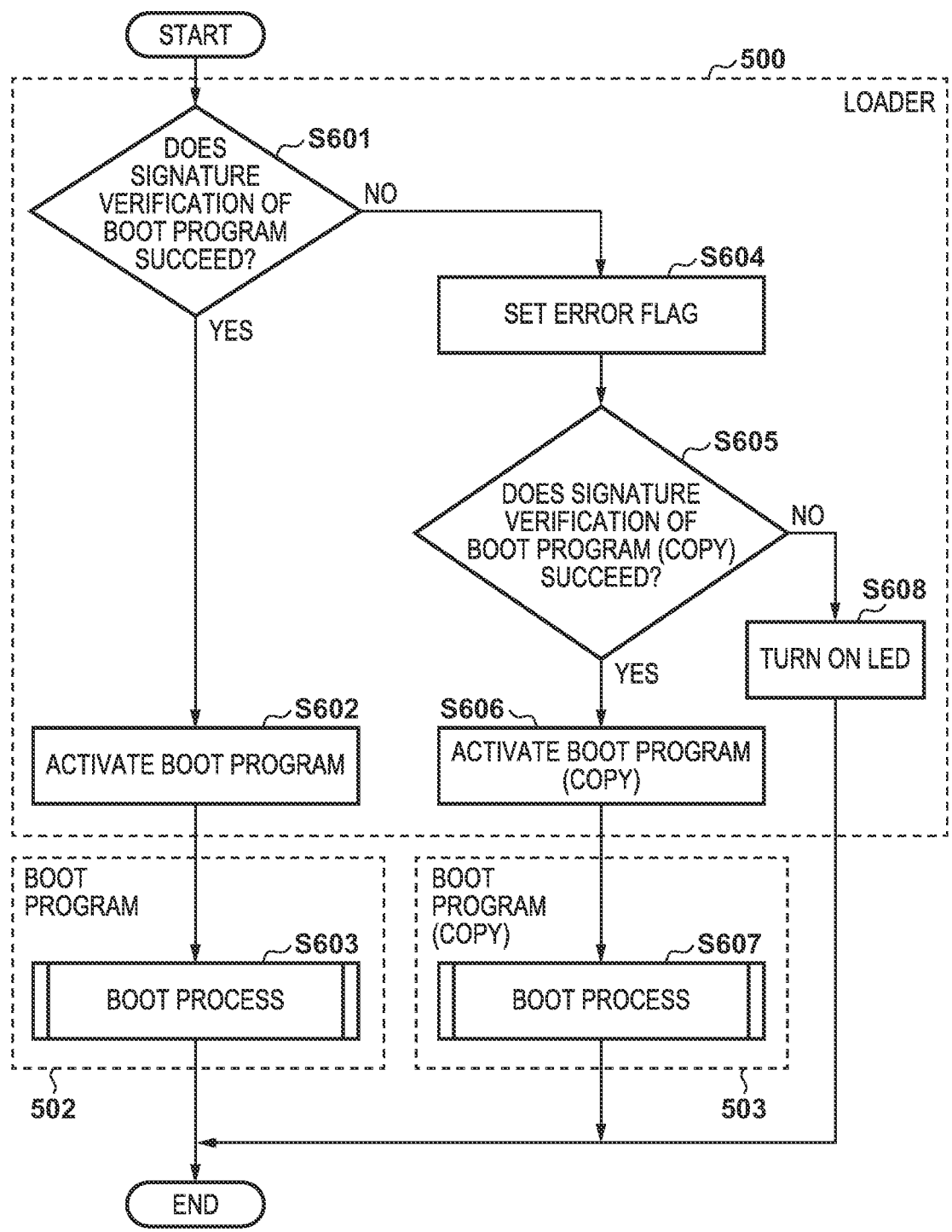
FIG. 6 is a flowchart for describing a process at startup by a CPU 103 of the multi-function peripheral according to the second exemplary embodiment.
Figure 7:
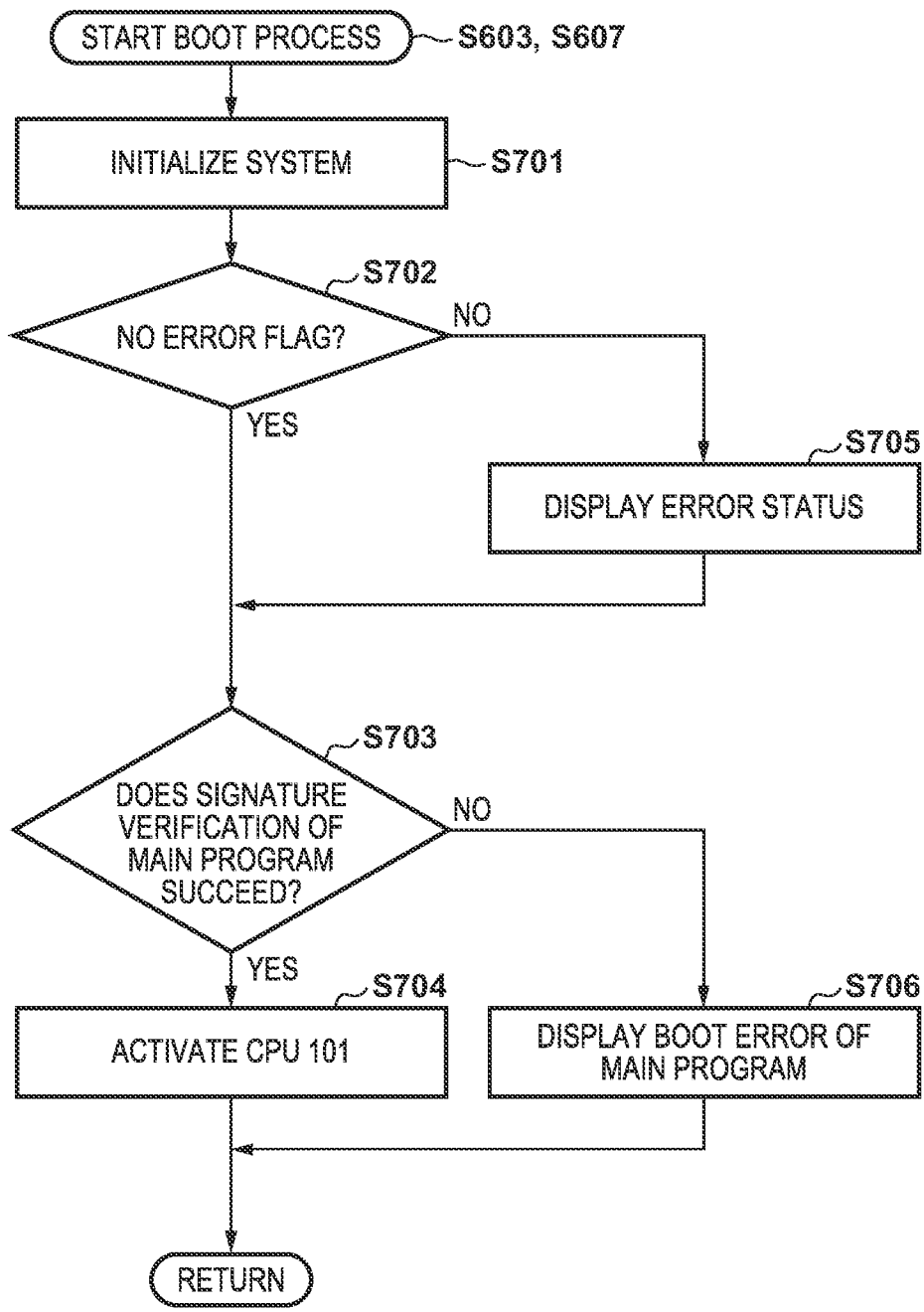
FIG. 7 is a flowchart for describing a boot process executed in step S603 and step S607 in FIG. 6.

FIGS. 6 and 7 are flowcharts for describing processing at startup by the CPU 103 of the MFP 10 according to the second exemplary embodiment. Furthermore, the process described in the flowchart is realized by the CPU 103 deploying the program stored in the NOR flash memory 145 to the RAM 104 and executing the deployed program. Further, this process is started by turning on the power of the MFP 10 and releasing the reset of the controller 20. Additionally, the broken lines illustrated in FIG. 6 indicate that each process is executed in one of the loader 500 and the boot programs 502 and 503.

FIG. 6 is a flowchart for describing processing flow at startup by the CPU 103 according to the second exemplary embodiment. All processing is executed by the CPU 103. This boot flow is started when the power supply of the MFP 10 is turned on, and the reset of the controller 20 is released.

When the CPU 103 is released from the reset, the loader 500 is first executed. When the loader 500 is executed, the signature verification of the boot program 502 stored in the NOR flash memory 145 is performed in step S601. Here, in a case where the signature verification of the boot program 502 is successful, the process proceeds to step S602, and the CPU 103 starts the boot program 502. In this way, when the boot program 502 is started, the process proceeds to step S603, and the boot process is executed. This boot process will be described later with reference to FIG. 7.

On the other hand, in a case where the signature verification of the boot program 502 fails in step S601, the process advances to step S604 to set an error flag. This error flag may be held in the CPU 103 or in the RAM 104. After setting the error flag in this way, the CPU 103 proceeds to step S605 and determines whether or not the signature verification of the copied boot program 503 has succeeded. Here, in a case where the signature verification of the copied boot program 503 is successful, the process proceeds to step S606 and the CPU 103 starts the copied boot program 503. Then, the process proceeds to step S607 to execute boot processing by the copied boot program 503.

In a case where the signature verification of the copied boot program 503 fails in step S605, the process advances to step S608, and the CPU 103 turns on the LED 148 to notify an error. This is similar to step S311 (FIG. 3) in the first exemplary embodiment.

FIG. 7 is a flowchart for describing the boot process performed in step S603 and step S607 in FIG. 6.

First, in step S701, the CPU 103 executes initialization of the entire system of the controller 20. Next, in step S702, the CPU 103 confirms the error flag. As described above, this error flag is a flag indicating whether an error has occurred in the signature verification of the boot programs 502 and 503 by the loader 500. Therefore, when step S603 in FIG. 6 is executed, that is, in the boot process of the boot program 502, the error flag is not always set. It is because the boot program 502 is not activated when the signature verification by the loader 500 is not successful. Therefore, in this case, the process proceeds from step S702 to step S703, and the CPU 103 performs the signature verification of the main program 208. Then, when the signature verification of the main program 208 is successful, the process proceeds to step S704, and after the main program 208 is deployed to the DRAM 114, the CPU 101 is released from reset to be activated.

On the other hand, in the boot process of step S607, it is determined in step S702 that the error flag is set, and the process proceeds to step S705. In step S705, the CPU 103 displays an error status on the UI unit 110 and the process proceeds to step S703. This error status indicates that the signature verification of the boot program 502 has failed, and the copied boot program 503 notifies the user on behalf of the loader 500. Then, in step S703, the CPU 103 performs the signature verification of the main program 208. Here, in a case where the signature verification of the main program 208 is successful, the process proceeds to step S704 to execute the processing described above. However, in a case where the signature verification of the main program 208 fails in step S703, the process proceeds to step S706, and the CPU 103 displays the boot error of the main program 208 on the UI unit 110. This is the same as step S310 in FIG. 3 of the first exemplary embodiment.

As described above, according to the second exemplary embodiment, even when the boot program has a redundant configuration, the boot program can display an error on the UI unit in response to the result of signature verification of the program by the loader.

Other Embodiments

Embodiments of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2018-184987, filed Sep. 28, 2018, which is hereby incorporated by reference herein in its entirety.

What is claimed is:

1. An information processing apparatus comprising:
    a non-volatile memory that stores a loading program;
    another non-volatile memory that stores a boot program and a notifying program for notifying an error; and
    a controller that executes the loading program at startup to verify the boot program to detect an alteration of the boot program, verifies the notifying program to detect an alteration of the notifying program based on a detection of an alteration of the boot program, and executes the notifying program in a case that the alteration of the notifying program was not detected.

2. The information processing apparatus according to claim 1, further comprising:
    a processor that executes instructions to function as a notification unit that notifies an error in a case where the controller detects the alteration of the boot program.

3. The information processing apparatus according to claim 1, further comprising:
    a rewritable second non-volatile memory that stores a main program executed by the controller,
    wherein the controller activates the boot program to detect an alteration of the main program in a case that the alteration of the boot program is not detected, and
    in a case that the alteration of the main program is not detected, the controller executes the main program.

4. The information processing apparatus according to claim 3, wherein
    in a case where the controller detects the alteration of the boot program, the controller notifies a boot error of the main program via the user interface.

5. The information processing apparatus according to claim 3, wherein
    the controller includes a first CPU and a second CPU, and
    wherein the first CPU executes the loading program to verify the alteration of the boot program,
    in a case that the alteration of the boot program is not detected, the first CPU activates the boot program to detect the alteration of the main program, and
    in a case that the alteration of the main program is not detected, the first CPU deploys the main program to a memory, and activates the second CPU to execute the main program.

6. The information processing apparatus according to claim 1,
    further comprising a user interface that includes a display unit,
    wherein the notifying program displays contents of the error on the display unit.

7. The information processing apparatus according to claim 1, wherein
    the non-volatile memory storing the loading program is not rewritable and the other non-volatile memory storing the boot program and the notifying program is rewritable.

8. A method of controlling an information processing apparatus including a non-volatile memory storing a loading program and a non-volatile memory storing a boot program and a notifying program for notifying an error, the method comprising:
    executing the loading program to verify the boot program to detect an alteration of the boot program at startup;
    verifying the notifying program to detect an alteration of the notifying program based on a detection of an alteration of the boot program; and
    executing the notifying program in a case that the alteration of the notifying program was not detected.

* * * * *